United States Patent [19]

Girgis

[11] 4,238,595
[45] Dec. 9, 1980

[54] MODIFIED PHENOLIC ALDEHYDE RESIN TO PRODUCE AN IMPROVED ADHESIVE COATING AND METHOD OF MAKING SAME

[75] Inventor: Mikhail M. Girgis, Pittsburgh, Pa.

[73] Assignee: PPG Industries, Inc., Pittsburgh, Pa.

[21] Appl. No.: 47,524

[22] Filed: Jun. 8, 1979

Related U.S. Application Data

[62] Division of Ser. No. 956,455, Oct. 31, 1978.

[51] Int. Cl.$^2$ .............................. C08G 14/06
[52] U.S. Cl. .............................. 528/158; 156/110 A; 156/110 C; 156/110 MD; 156/331; 156/335; 260/3; 260/29.3; 428/295; 428/382; 428/383; 428/392; 428/394; 428/397; 525/138
[58] Field of Search ................. 528/158; 525/138, 505

[56] References Cited

U.S. PATENT DOCUMENTS

| | | | |
|---|---|---|---|
| 2,302,885 | 11/1942 | Orthner et al. ............ | 528/158 X |
| 2,483,854 | 10/1949 | Snyder ...................... | 528/158 X |
| 2,873,718 | 2/1959 | Braujigam . | |
| 3,031,431 | 4/1962 | Rye . | |
| 3,037,968 | 6/1962 | Cottle et al. . | |
| 3,194,294 | 7/1965 | Van Gils .................. | 260/29.4 UA |
| 3,336,185 | 8/1967 | Helbing . | |
| 3,459,585 | 8/1969 | Killmeyer et al. . | |
| 3,509,018 | 4/1970 | Leshin et al. . | |
| 3,539,484 | 11/1970 | Bowman et al. . | |
| 3,619,252 | 11/1971 | Roscher . | |
| 3,734,918 | 5/1973 | Mayer et al. .............. | 260/29.3 |
| 3,852,232 | 12/1974 | Bowman et al. . | |
| 3,895,163 | 7/1975 | Elmer ....................... | 428/295 |

OTHER PUBLICATIONS

Modern plastics, Pollak pp. 45, 74 & 76, 1939.

*Primary Examiner*—Howard E. Schain
*Attorney, Agent, or Firm*—Kenneth J. Stachel

[57] ABSTRACT

Phenolic aldehyde resins used in adhesive coatings for binding substrates to rubber are modified to provide better adhesion and to decrease the problem of blowholes on the substrate coated with the adhesive coating. The resin is modified by incorporating into the resin a compound selected from the group consisting of urea, thiourea, thionamide having one to six carbon atoms or mixture thereof. In the method of preparing the modified phenolic aldehyde resin about 1 to about 10 weight percent based on the resin is added to the aqueous solution either simultaneously with or sequentially after the addition of the phenolic compond and aldehyde. The modified phenolic resin is then combined with an elastomeric latex or latices to produce the improved adhesive coating.

7 Claims, No Drawings

MODIFIED PHENOLIC ALDEHYDE RESIN TO PRODUCE AN IMPROVED ADHESIVE COATING AND METHOD OF MAKING SAME

This is a division of application Ser. No. 956,455, filed Oct. 31, 1978.

BACKGROUND OF THE INVENTION

The present invention is directed to a modified phenolic resin composition, method of making same, and an improved adhesive coating composition. More particularly, the present invention is directed to a modified phenolic aldehyde resin composition and method of making same and an improved adhesive coating composition for adhesion of glass fibers to rubber and to the coated glass fiber bundles useful in producing reinforced rubber products.

Fiberous materials have been used extensively as reinforcing material for rubber. The fiberous reinforced rubber products have found use in pneumatic tires, power-drive belts, conveyor belts, timing belts, high-pressure hoses and the like.

Glass fibers in the form of individual fibers, and groups of fibers in the form of strand, roving, cord, rope, fabric and the like are excellent reinforcing materials and give reinforced rubber products good dimensional stability, strength, resiliency and wear. Glass fibers are distinguishable from other fiberous reinforcing materials such as natural and synthetic organic fibers, in that glass fibers do not become elongated or deformed under stress to the extent of other fibers. Unlike other fibers, particular combinations of glass fibers with encapsulating coatings cooperate to yield reinforced materials that have greater strength than either the glass or the coating material alone. While fiberous materials other than glass which are subject to substantial stress elongation are essentially limited in tensile strength to the basic strength of the bare fibers, even if coated, properly coated glass fibers have greater strength than the glass alone.

When glass fibers are used as reinforcing material for rubber, the glass fibers are usually in the form of reinforcing cord or other bundle form, where individual fibers are coated with a size and then brought together into strand. The size is a chemical composition usually containing a coupling agent, such as silane, or Werner complex, a lubricant and other ingredients for handling purposes. The strand or plurality of strands of glass fibers are twisted, intertwisted and/or piled in the conventional manner for cord, yarn, thread formation or other bundle forms. The cord or other bundle forms are coated by dipping or otherwise contacting with a coating mixture containing an elastomeric latex and a homogeneous resin component. Usually the homogeneous resin component is a phenolic aldehyde condensate resin made from resorcinol, formaldehyde and/or phenol. The condensate resin usually has a formaldehyde to phenolic ratio of 0.4 to 0.8 formaldehyde to phenol on a mole basis. Such a resin is characterized by a low degree of polymerization and minimum molecular weight. A particularly useful resorcinol formaldehyde resin with a ratio of 0.6 formaldehyde to 1 resorcinol is sold under the designation Penacolite ® R-2200 resin.

The phenolic aldehyde condensate resins have been produced with many different structures and many additives have been used in the production of the phenolic aldehyde condensate resins. Also, phenolic aldehyde condensate resins have acted as modifiers in the polymerization of other polymers.

In U.S. Pat. No. 2,483,854 (Snyder) modified carbamide (urea) resins are added to overcome the disadvantages of lack of toughness, flexibility and water resistance of the urea-aldehyde resins. The modified carbamide resins consist of a phenol modified urea formaldehyde resin that is particularly useful as a coating and laminating material. The modified carbamide resin is produced by simultaneously reacting a preponderant amount of urea and a smaller amount of thiourea and phenol with formaldehyde. Approximately 10 percent phenol and 10 percent thiourea are used in producing the modified carbamide resin.

In U.S. Pat. No. 3,509,018 (Leshin et al) discloses the use of a resin formed insitu from the reaction of a methylene acceptor and a methylene donor reactible therewith in the production of a rubber and non-metallic reinforced rubber structures. The methylene donor that is used in forming the insitu resin in the rubber being bonded to the surface of the reinforcing agent contains at least a 3 valent nitrogen connected to at least one ($-CH_2-$) radical. The remaining valence on the $CH_2$ radical is connected to an oxy radical ($-OX$), where x is hydrogen or lower alkyl group. The resin formed insitu from the methylene donor and the methylene acceptor present in the rubber co mpound bonds a rubber component to a polyester or polycarbonate fiber. The laminate of rubber component, insitu formed resin, and polyester or polycarbonate fiber is prepared by coating the rubber onto a fabric of reinforced fibers of polyester or polycarbonate in the usual manner of calendering a coating of the vulcanizable rubber composition onto both sides of the fabric as is done in the conventional manner for coating a tire cord fabric with the tire carcass stock. The reinforcing fabric may be used without any previous treatment and under these conditions fabric is known as gray cord indicating that no treatment in the form of an adhesive composition has been applied for the surface of cord.

In U.S. Pat. No. 3,539,484 and 3,852,232 (Bowman et al) are directed to the production of a resin binder composition by reacting urea-formaldehyde or a thiourea-formaldehyde with a phenol and formaldehyde in the presence of an alkaline catalyst. Generally the phenol to formaldehyde mole ratio added to the initial urea-thiourea-formaldehyde composition is in the range of 1:1 to about 0.25:1. Also all or a part of the phenol used in the composition can be replaced with similar phenolic compounds such as cresol, xylenol, cresylic acid and mixtures thereof. The resin binder composition so produced has an improved chemical structure so that a reduced amount of odor bearing fumes or material is evolved during the curing of the resin binder composition for bonding discrete, inert solid particles such as sand, abrasive grit, wood chips, carbon particles and the like.

In the use of glass fibers as fiberous reinforcing material with a resin latex coating for rubber, it has been suggested to incorporate more individual filaments per unit area in the rubber, which means the packing of the cord or bundle form with glass fibers must be greater. It has been found that in order to facilitate in maintaining the necessary packing, a thicker cord is required, and cords having from 10–15 strands therein have been found to have utility for this purpose. However, this cord with more strands therein produces an effect known as blowholes. A blowhole is caused when cord is cured within a rubber matrix and individual strands, which comprise the cord, have greater adhesion to the rubber matrix than cohesion to themselves. Therefore, the strands separate and pull apart, thus including an air space between the individual strand and the cord. This blowhole phenomenon detracts from the desirable properties that can be obtained in a glass fiber reinforced rubber product having more reinforcement by virtue of incorporating more individual filaments per unit area in the rubber. Therefore, there is a need for an improved phenolic aldehyde resin, and improved phenolic aldehyde latex coating composition to reduce or completely obviate the blowhole phenomenon on any substrate, typically glass fibers.

It is an object of the present invention to provide a modified phenolic aldehyde resin, method of making same, and phenol aldehyde latex adhesive coating for a substrate strand and particularly for glass fiber strand, which is used as a fiberous reinforcement material for rubber, which provides better adhesion between the glass fiber bundles and the rubber, and which reduces the blowhole phenomenon.

SUMMARY OF THE INVENTION

In accordance with the present invention a phenolic resin, method of making same, adhesive composition and coated glass fibers are provided wherein better adhesion between the glass fibers and the rubber is obtained in the production of glass fiber reinforced rubber, and wherein the blowhole phenomenon for coated glass fibers reinforced rubber is reduced.

The novel, thermoplastic, water soluble, phenolic resin of the present invention comprises a resin produced from reacting a phenolic compound and a methylene donor and a thionamide having one to six carbon atoms. The amount of phenolic compound, methylene donor and thionamide used are those that give a ratio of phenolic compound to methylene donor in the range of 0.2 to 2.0 and a ratio of thionamide to phenolic compound in the range of 0.2 to 2 and a ratio of thionamide to methylene donor in the range of 0.5 to 5. Also, either thiourea or urea or both can be substituted for a portion of the thionamide. The reaction conditions used are those conditions that are normally used for reacting a phenolic compound a methylene donor to produce a phenolic condensate polymer either in an acid or basic medium in one step or in several steps.

The method of preparing the thermoplastic, water soluble, phenolic resin of the present invention involves reacting the aforementioned amounts of the phenolic compound, methylene donor, and thionamide having one to six carbon atoms either simultaneously or sequentially. In the sequential addition the phenolic compound and methylene donor are reacted in a mole ratio in the range of 0.2 to 2.0 phenolic compound to methylene donor to form a thermoplastic, water-soluble resin. A thionamide having one to six carbon atoms in an amount in the range of about 1 to about 10 weight percent of the resin is added to the resin at resin forming conditions. This sequential method produces the modified phenolic resin of the present invention.

The novel adhesive coating of the present invention comprises the modified thionamide phenolic resin or a phenolic resin modified with urea and/or thiourea and an elastomeric latex. The urea and/or thiourea modified phenolic resins are prepared so the resin contains about 1 to about 10 percent of the urea or thiourea or mixture thereof in the polymer chain. The adhesive coating containing the modified phenolic resin and the latex is applied to at least one glass fiber and the glass fiber is dried to provide a glass fiber coated with the dried residue of these coatings.

DETAILED DESCRIPTION OF THE INVENTION

In the thionamide modified phenolic resin of the present invention the phenolic compound can be phenol, cresol, xylenol, cresylic acid, resorcinol, or a resorcinol formaldehyde resin or resorcinol-phenol-formaldehyde resin such as Penacolite 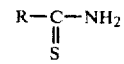 resin, available from Koppers Co., Inc., and mixtures thereof. In the preferred embodiment the phenolic compound is resorcinol or in the alternative a mixture of resorcinol and phenol.

The methylene donor that can be used in the formation of the thionamide modified phenolic resin of the present invention includes formaldehyde or materials which are capable of yielding formaldehyde such as paraformaldehyde. A portion of the methylene donor may consist of the formaldehyde generator, hexamethoxymethylmelamine or hexamethylene tetramine. Preferably the methylene donor is formaldehyde in the form of formalin, which is a 37 percent aqueous solution of formaldehyde. Hereinafter the term "formaldehyde" will be used for the methylene donor, but any of the aforementioned methylene donors could be used.

The thionamide used in the preparation of the thionamide modified phenolic resin of the present invention may be any thionamide that is water soluble, which restricts the number of thionamide to those having one to six carbon atoms as depicted in the formula below:

$$R-\underset{S}{\overset{\|}{C}}-NH_2$$

where R is a saturated alkyl group having from one to five carbon atoms including a methyl group up to and including a pentyl group and also including iso-sec-and tert-alkyl groups in the $C_3$ to $C_5$ carbon range. Preferably the thionamide is thioacetamide.

The preferred method of making the thionamide modified phenolic resin of the present invention includes reacting resorcinol, formalin and the thionamide in amounts so that the ratio of resorcinol to formaldehyde is in the range of 0.2 to 2.0 and the ratio of thionamide to phenol is in the range of 0.2 to 2.0 and the ratio of thionamide to formaldehyde is in the range of 0.5 to 5. The reaction can be performed using any conditions known to those skilled in the art for preparing a resorcinol formaldehyde resin. Also any conditions known to those skilled in the art for producing a phenol formaldehyde resin or a resin having a mixture of resorcinol and phenol can be used. Generally the temperature of the reaction is in the range of around 0° C. to the boiling point of the aqueous mixture for a period of time in the range of about 1 to about 20 hours.

The preferred method of preparing the resin is a two step method, wherein the first step is at an acidic pH and the second step is at a basic pH. The two step method involves reacting the phenolic compound, formaldehyde or formaldehyde and hexamethoxymethylmelamine, urea, or thiourea, or thionamide or mixture thereof in the acid environment provided by the reactants themselves. Although conventional acid catalysts can be used to reduce further the acid pH. Then after an initial reaction period has elapsed the pH is neutralized to around 7 to around 7.5 and the reaction mixture is preferably aged for around 1 to around 20 hours. The neutralization can be performed by adding basic material, such as ammonium, sodium or potassium hydroxide to the reaction mixture or by adding the reaction mixture to the latex or mixture of latices to form the adhesive coating composition. In the former case the neutralization occurs and the neutralized material may or may not be aged before adding the resin mixture to the latex or mixture of latices. The reaction conditions in the first step of the two step method include: a pH of around 1 to around 5.5, a temperature of around 30° F. (−1.1 C.) to about 122° F. (50° C.) and a residence time of about 1 to about 20 hours to produce an essentially linear polymer. In the second step the conditions are a pH of around 7 to around 7.5, a temperature of around 50° F. (10° C.) to around 140° F. (60° C.) and a residence time of about 0.75 hours to about 20 hours in order to add slight cross-linking to the linear polymer chain.

In an alternative embodiment of the method for preparing the thionamide modified phenolic resin of the present invention the thionamide is added to a reaction mixture of resorcinol or mixture of resorcinol and phenol and formaldehyde wherein the ratio of resorcinol to formaldehyde is in the range of 0.2 to about 2.0 wherein the amount of thionamide added in the range from about 1 to about 10 weight percent of the final product resin. It is preferred to add this amount of thionamide when the reaction mixture of resorcinol, or resorcinol and phenol, and formaldehyde are in an acid pH environment before any ageing in a basic pH environment.

It is believed, but the invention is not limited by this belief, that the degree of polymerization of the thionamide modified phenolic resin of the present invention is not large and the polymeric structure is a random arrangement of resorcinol, thionamide and formaldehyde moieties. Actually, the resin is a mixture, of polymer forms where there are usually less than around three methylene bridges fully attached in the chains of the linear polymer form. The polymer forms may contain any arrangement such as thionamide linked together by a methylene bridge and resorcinol linked to resorcinol and two thionamides linked to different positions of a resorcinol. The majority of the polymeric chain is comprised of the resorcinol linked to a thionamide moiety via a methylene bridge and then the thionamide moiety is also linked to a resorcinol moiety via a methylene bridge at the opposite end of the thionamide moiety. When urea or thiourea or mixture thereof is substituted for a portion of the thionamide the randomness of the arrangement in the polymer forms will increase to include the linking of the urea and thiourea to the other compounds that are present via methylene bridges.

The adhesive coating of the present invention is comprised of a thionamide, urea, or thiourea modified phenolic resin and an elastomeric latex.

The modified phenolic resin containing thionamide and/or urea and/or thiourea is prepared in a similar way to the aforementioned preparation of the thionamide modified phenolic resin. Once again any of the aforementioned phenolic compounds or methylene donors can be used in the preparation of the phenolic resin, but preferably resorcinol and formaldehyde as formalin are used. When thiourea and/or urea are not substituted for thionamide but used in lieu of thionamide the resorcinol and formalin can be reacted along with the urea and/or thiourea, or the resorcinol and formaldehyde can be reacted first and then the urea and/or thiourea are added to the resorcinol formaldehyde reaction mixture, again preferably in an acidic pH. The amounts of resorcinol formaldehyde and urea and/or thiourea used in preparation of the phenolic resin are such that the urea and thiourea or mixture thereof comprise about 1 to about 40 weight percent of the final phenolic resin. When the reactants are mixed simultaneously the amounts should be such as to give a ratio of phenol to formaldehyde in the range of 0.2 to about 2.0 and a ratio of urea or thiourea or mixture thereof to formaldehyde in the range of about 0.5 to 5.0. In an alternative embodiment the resorcinol and formaldehyde are reacted first in an aqueous solution to produce a resorcinol formaldehyde reaction mixture. The mole ratio of resorcinol to formaldehyde in the range of about 0.2 to about 2.0 and preferably in the range of 0.6 to 1.3. The urea or thiourea or mixture thereof is added to this resorcinol formaldehyde reaction mixture in an amount in the range from about 1 to about 40 weight percent of the final urea and/or thiourea modified resorcinol formaldehyde resin. In preparing the thionamide, urea, or thiourea modified phenolic resin, any reaction vessel known to those skilled in the art may be used in the resin preparation.

The thionamide, and/or urea and/or thiourea modified phenolic resin prepared in accordance with the above method is now combined with an aqueous elastomeric latex or combination of latices to form the adhesive coating of the present invention. The elastomeric latices useful in adhesive coating of the present invention are the conventional latices used in the formation of the rubber adhesive dips for use in preparing fiber reinforced rubber products. Suitable elastomeric latices are the synthetic elastomeric latices such as vinyl pyridines-styrenebutadiene copolymer latices sold commercially under the trademarks GEN-TAC, GOODRITE, or PYRATEX. Also hot polymerized (2,000 series) styrene-butadiene latices cold polymerized (2,100 series), styrenebutadiene latices, reclaimed rubber dispersions, butyl rubber dispersions, and ethylene-propylene-butadiene terpolymer elastomeric dispersion, and neoprene latices and mixtures thereof can be used. Also carboxylated derivatives of the elastomer like carboxylated polybutadiene can be used.

Other latices include natural rubber latex which may be the crude rubber latex or the latex which contains added material, or which has been treated to alter the character of the rubber, for instance by degradation, or oxidation, or both can be used as the elastomeric latex in the adhesive composition of the present invention. For instance the latex may contain any desired accelerator vulcanizers, stabilizers, dispersing agents or any other substance such as are commonly used in the rubber industry. When the elastomer is used as an artificial dispersion of either natural or any known synthetic rubber it may likewise contain additional substances as rubber accelerators, vulcanizers, stabilizers, dispersing agents and the like.

Besides these specified elastomeric latices and dispersions any combination of the above is hereby disclosed for the purposes of this invention.

A particularly effective combination is a neoprene latex and styrene-butadiene-vinyl pyridine latex. In order for the neoprene latex to be properly incorporated into any adhesive coating composition an emulsifying agent which is anionic in nature must be used. Typically emulsifying agents such as sodium rosinate and the potassium salt of disproportionated resin are used as emulsifiers in the neoprene latex which can be used in the adhesive coating composition of the present invention. The smallest content of the neoprene latex ranges from 34 percent to about 60 percent and preferably 50–60 percent. Dupont neoprene latices number 750,571 and 670 have been found particularly useful and are all anionically emulsified. The other elastomer in the two component elastomeric system is a styrene-butadiene-vinyl pyridine latex wherein the ratio of styrene to butadiene is typically about 50:50 which accounts for about 89 to 95 percent of the mole basis of the monomeric components of the polymer. The other 5 to 11 percent is vinyl pyridine monomer. The vinyl pyridine constituent of the polymer is considered to impart desirable characteristics of adhesion and therefore, when less than 5 percent of the monomer in the polymer is vinyl pyridine the adhesion is substantially reduced. However, 11 percent vinyl pyridine in the polymer appears to give proportional benefits commensurate with cost since the vinyl pyridine portion of the polymer constitutes a major portion of the cost thereof. The styrene-butadiene-vinyl pyridine latex is usually 35–50 percent by weight solids, and, more preferably percent solids. On a dry solids basis, based on 100 parts of solid rubber in a coating formulation, 50–90 parts should be constituted of the styrene-butadiene-vinyl pyridine latex and preferably about 70–80 parts on a dry solids basis. Also a natural rubber latex may be added in quantities up to 25 parts by weight solids to increase the tacking of the adhesive coating composition when applied to glass fibers to promote adhesion between the coated glass fibers and rubber stock during processing.

Generally when a polybutadiene type latex is used, the latex will be employed in an amount within the range of about 80 to about 98 percent by weight of the adhesive coating. In a preferred embodiment of the invention the latex will be employed in an amount of about 90 to about 96 weight percent of the adhesive coating.

In addition to the modified phenolic resin and the latex, the adhesive coating may contain a suitable wax emulsion to protect the elastomer in the adhesive coating composition from attack by ultraviolet light. Preferably up to 25 parts by weight on a dry solids basis, based on 100 parts of elastomer solid, is incorporated into the coating composition. Greater than 25 parts of wax affects adhesion of the coating composition to the resin matrix. Another advantage of the wax constituent is that it prevents tackiness of glass fibers coated with the adhesive composition and improves runability. The preferred amount of the wax is up to 5 parts by weight to obtain the maximum benefit. These waxes generally have a melting point of higher than about 50° C. for the paraffin waxes and microcrystalline waxes. The preferred melting point for the microcrystalline waxes is above about 100° C. or more preferably above 135° C. When paraffin wax is employed in the coating composition, their melting point should generally vary between 50° C. to about 80° C.

When a neoprene latex is used in the adhesive coating composition zinc oxide, magnesium oxide, litharge or red lead are incorporated into the adhesive coating composition to promote cross-linking or curing of the neoprene and to improve resistance of the adhesive coating composition to aging heat and light and also act as acid acceptors to accept the hydrogen fluoride generated by the cross-linking of the neoprene. Up to three parts by weight of one of these materials or a combination thereof have been found to be useful. Zinc oxide has particular utility in the coating composition. Because the level of zinc oxide or other acid acceptor is continguent upon the level of neoprene in the adhesive coating composition about up to one part by weight of zinc oxide to about 10 parts by weight of neoprene is the desired ratio to provide optimum properties to the cured coating composition. Thus, in a formulation having 50 parts neoprene, up to 5 parts zinc oxide is a preferred range. Typically, when 25 parts neoprene is used up to 1.2 parts of the zinc oxide is used.

In order to improve the heat resistance of glass fibers coated with adhesive composition of the present invention, especially when glass fibers coated with the adhesive coating composition of the present invention are to be incorporated into pneumatic tires, thus encountering heat on running, up to about 1.5 parts of hexamethylenetetraamine can be used in the coating composition, and more preferably 0.75 parts. The hexamethylenetetraamine in addition to improving the heat aging, also improves adhesion of glass fibers coated with the adhesive coating composition of the present invention to the elastomeric matrix.

Treated diatomaceous earth may be incorporated into the composition to provide heat tensile aging characteristics. The chemical diatomaceous earths are those hydrothermally reacted with lime or magnesium oxide. Typically, these materials are characterized as hydrocalcium silicates and hydromagnesium silicates. Materials such as Microcell ® and Celikate ® sold by Johns-Mansville Company are useful diatomaceous earths so long as they contain a calcium oxide level in the range of 22–28 percent and a magnesium oxide level of about 16 percent.

Other ingredients known to those skilled in the art may be added to the adhesive coating composition to impart varying characteristics thereto. However, the material previously recited have been found particularly useful in an improved adhesive coating composition for use in coating glass fibers to produce a fiber coated cord to be incorporated into elastomeric matrices.

The term "elastomer" as used herein means and includes both synthetic and/or natural rubber. "Natural rubber" as used herein is the elastic solid obtained from the sap or latex of the havea tree, the major constituent being the homopolymer of 2-methyl-1,-3-butadiene(isoprene). By "synthetic rubber" as used herein it is meant to encompass polymers based on at least two percent of a conjugated unsaturated monomer, said conjugation being in a 1–3 position in the monomer chain and the final polymer in its incured state has an extensibility of at least 200 percent and a memory of at least 90 percent, when stretched within its extensibility limits and released instantaneously. The unsaturated monomers which are used in preparation of synthetic rubber are but not limited to chloroprene, butadiene, isoprene, cyclopentadiene, dicyclopentadiene and the like. Other monomers capable of free radical, anionic, or cationic polymerization may be incorporated into the polymer chain along with the conjugated unsaturated monomers to form useful synthetic rubbers. These olefins are typically monoethylenically unsaturated monomers. Monomerically unsaturated monomers as used herein are characterized by the —$CH_2$=C—group. These monoethylenically unsaturated monomers are, but not limited to, the acrylic monomers such as methacrylic monomers, such as methacrylic acid, acrylic acid, acrylonitrile, methacrylonitrile, methylacrylate, methylmethacrylate, ethylacrylate, ethylmethacrylate, and the like. Monoolefinic hydrocarbons such as ethylene, butylene, propylene, styrene, alpha-methylstyrene and the like and other functional monounsaturated monomers such as vinyl pyridine, vinyl pyrolidone and the like monomers.

The adhesive coating composition is prepared having the following composition based on 100 parts by weight solid of the elastomeric latex.

| Ingredients | Range Parts by Weight Non-Aqueous | Preferred Composition Parts by Weight |
|---|---|---|
| Butadiene type latex 30-60 percent solids | 80-98 | 90-96 |
| Thionamide, and/or urea, and/or thiourea modified resorcinol formaldehyde resin | 4-20 | 11 |
| Ammonium hydroxide (28 percent in water) | 0.14-.56 | 0.14 |
| Wax | Up to 25 | 5 |
| Hexamethylenetetraamine | Up to 1.5 | .75 |
| Treated diatomaceous earth | 0.5-5 | .75 |
| Water sufficient to produce a mixture having 20 to 40 percent by weight solids and preferably 25-35 percent solids | | |

In a method of producing glass fibers coated with the adhesive coating composition of the present invention to yield glass fiber cord, glass fibers are sized with a conventional glass fiber sizing composition. Preferably included in the sizing composition is a dual-functional coupling agent such as a silicone containing organic compound or a "Werner" complex which establishes a bond with the glass through the metal atom and a bond with the rubber through the organic radicals attached to the metal atom. Typically, useful reactants in the form of silane coupling agents are, but not limited to, gamma-aminopropyltriethoxysilane, beta-hydroxethyl gamma-aminopropyltriethoxy silane, and beta-aminoethyl gamma-aminopropyltriethoxysilane, $(CH_3O)_3$, $Si(CH_2)_3$, $NH(CH_2)_2$, $COOCH_3$, gamma-glycidoxypropyltrimethoxysilane, vinyl triacetoxy silane, gamma-methacryloxypropyltrimethoxysilane, vinyltriethoxysilane, vinyl(beta-methoxy-ethoxy) silane, beta-(3,4-epoxy-cyclohexyl) ethyltrimethoxy silane and the like. Typical of the sizes which may be applied to the glass fibers, which are subsequently to be coated and processed into cord, are the sizes disclosed in U.S. Pat. Nos. 3,437,517; 3,459,585 and 3,887,389 incorporated by reference herein.

Generally, in the method of forming glass fiber cord in accordance with the invention, the glass fibers are formed at a fiber-forming bushing, sized with an aqueous sizing composition (hereinbefore discussed) gathered into strand and wound on a forming package. This process is more fully described in the aforementioned patents. The forming packages are then dried and mounted on a creel, unwound and coated with the coating composition of the invention.

A preferred method of producing the coated glass fiber bundles of this invention is to contact a continuous bundle, for example, strand which has been previously sized with the coating composition of the invention, dry the coating within the bundle, and then cure the coating residing within and about the bundle to produce a coated cord suitable for rubber reinforcement. A particularly advantageous method for producing the glass fiber bundles of the invention is based upon the method described in U.S. Pat. No. 3,619,252 "Manufacturer of Eastomer Coated Glass Fibers" by Alfred M. Rocher, which is incorporated herein by reference. This invention is particularly applicable to glass fiber, filament bundles, having complete filament encapsulation and having a relatively high ratio of coating weight (i.e., about 15-40 percent) to glass weight.

A plurality of glass fiber strand, which has been previously sized, are combined in parallel relation and passed through a guide in tangential contact across motor driven rollers. The rollers are partially immersed in an aqueous rubber dip emulsion and these rollers pick up the coating material when rotated. The coating which is picked up is brought into contact with the glass fiber strands, coating and impregnating the combined bundle of strands. Relaxation of the tension in the combined bundle of strands opens the spacing between the fibers and between strands enhancing impregnation of the coating into the bundle. Typically, the coating composition solids of the aqueous dip will be about 20-40 percent, depending upon the total amount of coating composition solids to be imparted into the glass fiber cord. Lower solids level will produce cord with low coating add-on based on the weight of the glass, and a higher solids content will produce a coated glass fiber cord having a high amount of coating composition solids based on the weight of the glass. Thus, coating add-on weight is about 15-40 percent based on the weight of the glass fibers, more preferably 20-30 percent to provide a coated glass fiber bundle or cord which is useful for the reinforcement of elastomeric matrices.

After contacting the fiber glass bundle with the coating composition for sufficient time to fully impregnate the bundle with water and solids-containing dip, the bundle is passed through a dielectric heater or drying oven. The drying oven is so designed and operated that water is removed rapidly from the inside of the bundle as well as from the surface of the bundle without substantial migration of the solids from the interior of the surface of the bundle and without excessive blistering.

The dried glass fiber bundle is then subjected to heat to partially cure the rubber adhesive coatings throughout the bundle. It is preferable to partially cure the coating, while completing the curing of the coating on the glass fiber when it is embedded in the rubber matrix being reinforced during the curing of the rubber in the final article.

A second method for making the glass fiber bundles of the invention is based upon the method described in U.S. Pat. No. 3,718,448 entitle, "Fiber Forming and Coating Process" by Warren W. Drummond and Donald W. Denniston, which is assigned to the present assignee and which is incorporated herein by reference and made a part hereof. Upon forming individual glass fibers which are drawn over a roller coater, such as described in U.S. Pat. No. 2,873,718, the coating composition having a silane coupling agent described previously herein, is applied to the fibers passing over the roller. The coated fibers are brought together into strand and are dried. Drying is accomplished by passing the strands through a dielectric oven, hot gas or convection oven, or an infrared radiant heating chamber. The strands of glass fibers are brought together into cords or rovings and are further heated to partially cure the coating composition and bond the strands together into a bundle. Following this, if additional elastomer coating is desired, the composite glass fiber bundle may be further coated or impregnated with additional coating.

To further illustrate the resin composition and method of making same and adhesive coating composition of the present invention reference should be made to the following examples.

EXAMPLE I

A thermoplastic, water soluble, resin was prepared of adding with agitation to a mixing tank that could be cooled by circulating cold water in its outer packet 500 grams of water at 75° F.±2° F. (24°±1° C.) 52 grams of thionacetamide, 600 grams of Penacolite® R-2200 resin, and 56 grams formaldehyde in the form of formalin with continued agitation. This mixture was aged for around 15-16 hours at room temperature 23°-24° C.

In a main mixing tank ammonium hydroxide in an amount of 32 grams was dissolved in 4,525 grams of water. The latex, GT-FS (41% solids) a vinyl pyridine butadiene-styrene terpolymer latex from General Tire and Rubber Co. in an amount of 4270 grams was added slowly to the mix tank add agitated for 10 min. Also Gen Flo latex, a styrene butadiene emulsion polymer from General Tire and Rubber Co., in an amount of 2135 grams and Neoprene 735A a polychloroprene available from DuPont in an amount of 1995 grams were added to the mix tank with the GT-FS latex. Also to the mix tank there is added 105 grams of Agerite Resin D (50% solids), an antioxidant (polymerized 1,2-dihydro-2,2,4-trimethylquinoline) available from R. T. Vanderbilt Co. Inc. or B. F. Goodrich Chemical Co. The mixture in the mix tank continued to be agitated.

In a premix tank there were added Paracure® A09 antioxidant (50% solids); calcium treated diatomaceous earth, 50 percent, -and 2,6-ditertiary butyl phenol, 50 percent; in an amount of 35 grams and Mobilcer® Q (microcrystalline wax 50% solids) in an amount of 280 grams and zinc oxide (50% in water) in an amount of 7 grams. To these ingredients there was added 3,150 grams of water.

The aged thionacetamide modified resorcinol formaldehyde resin was added to the main mix tank very slowly and agitated. Then the aqueous solution of Paracure® A09, Mobilcer® Q and ZnO was added to the main mix tank and agitated for around 25 minutes. The mixture was allowed to age to produce the adhesive coating composition of the present invention. This ageing allows the thionacetamide modified resorcinol formaldehyde resin to age in a basic pH environment and constitutes the second step of the two step process for producing the resin.

One forming package of K-15 ⅓ glass fiber strand and one forming package of G-75 5/3 glass fiber strand were coated with the aboveprepared adhesive coating composition.

EXAMPLE II

To a premix tank, which could be cooled by circulating cold water in its outer jacket there was added 350 grams of water at 75° F.±2° F. (24°±1° C.). Also there were added 150 grams of ethyl alcohol and 52 grams of thiourea.

In a separate mix tank 600 grams of Pencholite® R-2200 resin were combined with 56 grams formaldehyde (37%). This mixture was added with agitation to the premix tank containing the thiourea. The premix was aged for 15-16 hours at room temperature (22°-24° C.) to produce a thiourea modified resorcinol formaldehyde resin mixture.

In a main mix tank, there was added water, GT-FS latex, Gen-Flo latex, Neoprene 735A latex and Agenite Resin D in the following amounts:

| Water | 4525 grams |
|---|---|
| GT-FS latex (41% solids) | 4270 grams |
| Gen Flo latex | 2135 grams |
| Neoprene 735A latex | 1995 grams |
| Agerite Resin D (50% solids) | 105 grams |

These materials were added slowly with continual agitation.

In a separate mix tank, there was prepared a mixture of water, Paracure® A09 antioxidant, zinc oxide and Mobilcer® Q wax in the exact amounts and the exact manner of Example I.

The thiourea modified resin mixture was added very slowly to the main mix tank containing the aqueous solution of latices and antioxidant. Then the aqueous solution of antioxidant, wax, and zinc oxide was added. The mixture was agitated for around 25 minutes and aged for 15-16 hours at room temperature (22°-24° C.) to produce the adhesive coating composition of the present invention. The coating composition was stable even when aged over night. An identical coating prepared in an identical manner to Example II but without thiourea, jelled when aged over night.

The thiourea-containing coating composition was used to coat a K-15 ⅓ and K-15 3/0 glass fiber strands and G-75 5/3 and G-75 15/0 glass fiber strands.

EXAMPLE III

A thermoplastic, water soluble resin was prepared wherein thiourea was used and hexamethoxymethylmelamine was substituted for a portion of the formaldehyde used to prepare the resin.

The resin was prepared by combining 60 lbs. (27.2 kg.) of solid resorcinol in 36 gallons (136 liters) of water at 75° F.±2° F. (24°±1° C.) in a mixing tank that could be cooled by circulating cold water in its outer jacket. The mixture was agitated until the resorcinol was completely dissolved. Thiourea (solid) in an amount of 10 lbs. (4.5 kg.) was added to the premix tank with continual agitation until completely dissolved. The Cyres 963, (99% solid) hexamethoxymethylmelamine, in an amount of 10 lbs (4.5 kg) was added very slowly to the premix tank with continual agitation. Next 35.5 lbs (16 kg.) of formaldehyde (37%) was added to the premix tank with continual agitation. The premix was aged for 4 hours at 70°-75° F. (21°-24° C.). After 4 hours aging, a solution of 10% potassium hydroxide (1 lb. in 10 gal.) 0.45 kg. in 36.78 liters) was added to the premix with continual agitation. The premix was aged for another four hours at 70°-75° F. (21°-24° C.) and the pH was around 7.3.

While the premix was aging for the second time, water in an amount of 51 gallons (193 liters) was added to a main mix tank. An amount of 1.5 lbs. (0.60 kg.) of potassium hydroxide (solid) was added and agitated until completely dissolved.

An amount of 610 lbs. (277 kg.) of G-143 latex (37% solids, a carboxylated polybutadiene available from General Tire and Rubber Co., Inc.) was added slowly at a rate of 20 lb/min. to the main mix tank and agitated for 10 minutes and the pH measured around 7 or higher. Then GT-FS (41% solids) latex in an amount of 670 lbs. (304 kg.) was added slowly at a rate of 20 lb./min. to the main mix tank with continual agitation. Then 10 lb. (4.5 kg.) of Agerite Resin D was added to the main mix tank and agitation was continued.

In another tank 36 gallons (22.7 liters) of water, 5 lbs. (2.3 kg) of Paracure ® A09 (50% solids) antioxidant and 50 lbs. (22.7 kg.) of Mobilcer ® Q wax were combined and agitated for 25 minutes. Then this mixture was added to the main mix tank and agitated for 25 minutes.

The thiourea, Cyres formaldehyde donor, and resorcinol formaldehyde resin mixture was added slowly to the main mix tank and agitated for 25 minutes. The mixture was allowed to age for 8 to 10 hours. Then a mixture of 3 lbs. (1.4 kg.) of ammonium hydroxide (28% ammonia in 2 gallons (7.6 liters) of water was added very slowly to the adhesive coating composition. The mixture was agitated for 25 minutes to produce the adhesive coating composition useful in coating glass fiber strands. The adhesive coating composition had $24\pm1$ percent solids, a pH of $8.3\pm0.3$ and a dip life of 48 hours after aging.

Glass fiber cord coated with the adhesive coating composition of Example I and Example II in rubber stock were tested for porosity and adhesion. The results of the testing are presented in Table I.

TABLE I

| Test | Example I coated glass cord in rubber stock | Example II coated glass cord in rubber stock |
|---|---|---|
| Breaking Strength (lbs./Newtons) | 154.2/686 | 144.8/644 |
| Elongation @ 40 lb (.%) | 2.4 | 2.4 |
| Elongation @ Break (%) | 4.7 | 4.5 |
| 1" H-Adhesion v-78 @ R.T. (lbs./Newtons) | 54.8/244 | 52.0/231 |
| 1"H-Adhesion V-78 @ 200 F. (lbs./Newtons) | 37.4/166 | 39.0/173 |
| 16 ERI Strip Adhesion V-78 (lbs./Newtons) | 57.3/255 | 55.6/247 |
| Appearance | 2 | 1 |

In Table I the "breaking Strength" was determined by placing a single cord in the jaws of an Instron ® test device with a gauge length of 25.4 cm and a cross head speed of 30.5 cm per minute. The jaws are separated and the force required to break the cord was recorded. The test was done in air, where only the ends of the cord are embedded in rubber.

Elongation at 40 lbs. is a measure of present elongation of the cord itself with a 40 lb. load using the Instron ® testing device. The elongation at break is the present elongation when the load is sufficient to break the cord.

The H-Adhesion Test is designed to measure the force required to pull a single cord, in the direction of its axis, from a strip of rubber in which the ends of the cord are embedded over a given length. The property measured is a sheaving force acting at the cord-to-rubber interphase. The two end strips of rubber with the interconnecting cord form a specimen resembling the letter "H", from which the test derives its name.

Strip adhesion for the rubber coated glass cord was determined by the following method. A cylindrical drum is wrapped by a $10.2\times26.7$ cm$\times0.1$ cm strip of rubber stock. The rubber stock occupied substantially all of the surface area of the cylindrical drum. The coated glass fiber yarn is wrapped about the rubber stock on the drum in a cylindrical fashion, providing a continuous layer of yarn over the rubber stock. The wound rubber stock is removed from the cylinder and cut into a $7.6\times25.4$ cm sample.

A strip of $7.6\times25.4$ cm. rubber is placed in a $7.6\times25.4$ cm. mold and the above rubber strip with the coated strand thereon is placed in the mold with the strand side away from the first rubber strip. Two $7.62\times2.54$ cm. strips of Holland cloth are placed at opposite ends of the strand side of the rubber strip. Another $7.62\times25.4$ cm. rubber strip is placed over the Holland cloth and lastly, a $7.62\times25.4$ cm. rubber strip of coated strand thereon is placed on the last mentioned rubber strip with the strand side in contact with the last mentioned rubber strip. The mold is closed and the rubber cord laminate is cured at 4,778 pascals for 30 minutes at 149° C. The rubber cord laminate is removed from the mold and is allowed to slowly cool overnight.

The laminate is cut into $14\times2.54$ cm. strips and heated for 30 minutes at 121° C., after which the Holland cloth is removed from the laminate. After setting an Instron test device for a gauge length of 1.27 to 1.9 cm. and calibrating the unit for a cross head speed of 5.1 cm. per minute, the bottom layer of the heated rubber and the exposed cord are placed in the top jaw and the top layer of the heated rubber in the bottom jaw of the test device. The Instron test device is operated until a separation of 5.1 cm. is obtained and the loading is noted. The top layer is inserted into the top jaw and the cord in the bottom jaw with a gauge length of 1.27 to 1.9 cm. The Instron device is operated until a separation of 5.1 is obtained and the loading is noted. The test is repeated for the opposite end of the specimen and for additional speciments included in the sample. The results of the tests are averaged for adhesion of the cords to rubber.

Appearance results are gauged on a scale of 1 to 10 were 1 is excellent and 10 is poor.

The results of Table I show the glass fiber cord coated with the adhesive coating of the present invention had significant improvement in the area of overcoming the porosity problem and also had very good adhesion.

In Table II the results are presented for testing glass fiber cord coated with an adhesive composition made in a simular fashion to that in Example II. The proportions of the ingredients were changed as indicated in Table II.

In Table II the "In Rubber Tensile" test was determined by curing the cord in a rubber matrix and testing the glass fiber cord reinforced matrix in an Instron test device with a gauge length of 17.8-19 cm. and a cross head speed of 5.1 cm. per minute. The jaws were separated and the force required to break the sample was recorded.

Also in Table II the Gristmill Test is a measure of compression fatigue resistance of the cord. The test involves mounting tires on a vehicle and driving the vehicle for a number of laps so that a major part of the stress is applied to the outside shoulder of the tire, where cord breakage is most likely to occur. Cord breaks in each tire belt are totaled and for uniformity adjusted to breaks/meter of belt length.

The other tests in Table II were conducted in a similar manner to those of Table I.

TABLE II

| Adhesive Coating Composition Solids (in parts/100 parts of total rubber on a dry basis) | "In Rubber Tensile" lbs./Newtons (N) | Strip Adhesion Rubber Stock lbs./Newtons/Rating[2] | Tire Test Gristmill 400 Laps (Breaks/Meter) | Results 800 Laps (Break/meter) |
|---|---|---|---|---|
| 12 Resorcinol, 2 thiourea, 2 cyres 963, 7.1 formaldehyde, Gen Flo 30% C.S. K-15 ⅛ glass fiber strands | 183/814 | 31/138/3.5 | 000 | 3.7 |
| 12 Resorcinol, No Thiourea, 2 Cyres 963 7.1 CH$_2$O, Gen Flo 8020, 30% C.S.[1] K-15 ⅛ glass fiber strands | 201/894 | 38/169/5.0 | 99 | — |
| Example III 36% D.S. K-15 ⅛ 22.15% Pick-up on glass | — | 24/107/2.0 | 0 | 7.4 |
| 9 Pesorcinol, 2 Thiourea, 2 Cyres 963 6.3 CH$_2$ Gen Flo 8020 (polybuadiene) 24% D.S. K-15 ⅛ | 193/858 | 25/111/3.8 | 1.5 | 11.8 |
| 9 Resorcinol, 2 Thiourea, 2 Cyres 963, 5.3 CH$_2$, carboxylated polybutadiene (General-146) | 192/854 | 12/53/1.0 | 13.9 | 38.2 |
| 9 Resorcinol, O Thiourea, 2 Cyres 963 5.3 CH$_2$), Gen Flo 8200 polybutadiene 24% C.S.[1] K-15 ⅛ glass fiber strand | 197/876 | 32/142/5.0 | 11.2 | 44. |

[1]C.S. is the solids content of the adhesive composition
[2]Strip adhesion rating 5 is best indicating bond failure is in the rubber; 1 is poor indicating bond failure is at the rubber ashesive interphase, commercially suitable is 4.

Table II illustrates the benefit of flexibility added by the use of thiourea or thioacetamide in the phenolic aldehyde resin used in the adhesive coating composition.

The foregoing has described a new and useful composition of predominantly phenolic aldehyde polymer and elastomeric latex for coating glass fibers. The coating gives the glass fibers better adhesion to rubber and reduces the blowhole phenomenon. The phenomenon occurs when glass fiber cord contains more glass fiber strands and is cured within a rubber matrix wherein the individual strands which comprise the cord have greater adhesion to the rubber matrix than cohesion to themselves; this causes the strands to separate and pull apart thus inducing an air space between the individual strand and cord. The foregoing has also described the new and useful method of making the modified phenolic aldehyde polymer used in the composition of polymer and elastomeric latex. Also described is a new and useful phenolic aldehyde polymer mixture which is modified by adding about 1 to about 10 weight percent of the polymer of a thionamide having 1 to 6 carbon atoms, the method of making the polymer mixture and the phenolic aldehyde elastomeric latex produced with the thionamide modified phenolic aldehyde polymer, and the glass fiber cord coated with the thionamide modified phenolic polymer elastomeric latex.

I claim:

1. A phenolic aldehyde resin comprising: a phenolic compound, a thionamide having 1 to 6 carbon atoms or said thionamide in combination with urea or thiourea in an amount to about 1 to about 10 weight percent of the resin, and an aldehyde selected from the group consisting of formaldehyde, paraformaldehyde, acetaldehyde, which is prepared by:

a. reacting the phenolic compound with a thionamide having 1 to 6 carbon atoms or thionamide mixture of said thionamide and urea or thiourea and aldehyde in an amount to give a mole ratio of phenolic compound to aldehyde in the range of about 0.2 to about 2.0 and a mole ratio of phenolic compound to thionamide or thionamide mixture in the range of about 0.2 to about 2.0 and a mole ratio of the thionamide or thionamide mixture to aldehyde in the range of about 0.5 to about 5.0 at an acid or a basic pH at a temperature in the range of about 0° C. to about 100° C. and for a period of time in the range of about 1 hr. to about 20 hrs.

2. Phenolic aldehyde resin according to claim 1 wherein the resin is prepared by reacting the phenolic compound with a stoichemetric excess of aldehyde and adding the thionamide in an amount in the range of about 1 to about 10 weight percent of the resin.

3. Phenolic aldehyde resin according to claim 1 wherein an amount of hexamethoxymethylmelamine is substituted for a portion of the aldehyde.

4. The phenolic aldehyde resin of claim 1 wherein after the reaction of the phenolic compound, the aldehyde and thionamide, the reaction product is neutralized to a pH in the range of about 7 to about 7.5.

5. The phenolic aldehyde resin of claim 1 wherein the neutralized phenolic aldehyde resin reaction product is aged at the pH in the range of about 7 to about 7.5 at a temperature in the range of about 50° F. (10° C.) to about 140° F. (60°) for a residence time in the range of about 0.75 hours to about 20 hours.

6. The phenolic aldehyde resin of claim 1 wherein the phenolic compound is selected from resorcinol, phenol, or a mixture of resorcinol and phenol.

7. The phenolic aldehyde resin of claim 1 wherein the thionamide is thioacetamide.

* * * * *